United States Patent [19]

Barkhau et al.

[11] Patent Number: 5,185,172

[45] Date of Patent: * Feb. 9, 1993

[54] METHOD FOR SIMULATING OPEN FLAME BROILED MEAT PRODUCTS

[75] Inventors: Keith D. Barkhau, LaGrange; John D. Beltz, Louisville; Donald R. Kupski, LaGrange, all of Ky.; Mitchell C. Henke, Fort Wayne, Ind.; Soldon A. Svensson, Cincinnati, Ohio

[73] Assignee: KFC Corporation, Louisville, Ky.

[ * ] Notice: The portion of the term of this patent subsequent to May 5, 2009 has been disclaimed.

[21] Appl. No.: 642,203

[22] Filed: Jan. 15, 1991

Related U.S. Application Data

[63] Continuation-in-part of Ser. No. 377,177, Jul. 10, 1989, Pat. No. 4,991,497.

[51] Int. Cl.⁵ .............................................. A23L 1/01
[52] U.S. Cl. ..................................... 426/523; 99/349; 99/388; 99/391; 99/475; 426/383; 426/466; 426/468
[58] Field of Search ............... 426/383, 520, 237, 466, 426/468, 523, 315, 241, 243; 99/349, 352, 373, 386, 388, 391, 393, 400, 430, 427, 441, 443 C, 444, 446, 475

[56] References Cited

U.S. PATENT DOCUMENTS

| | | |
|---|---|---|
| 685,342 | 10/1901 | Naylor . |
| 2,885,291 | 5/1959 | Sengelaub, Jr. . |
| 3,019,721 | 2/1962 | Haapala . |
| 3,640,209 | 2/1972 | Wilson ................................ 99/446 |
| 3,994,212 | 11/1976 | Wong .................................. 99/444 |
| 4,121,510 | 10/1978 | Frederick ........................... 99/435 |
| 4,154,861 | 5/1979 | Smith ................................ 426/466 |
| 4,186,217 | 1/1980 | Tchack .............................. 426/523 |
| 4,297,942 | 11/1981 | Benson et al. ...................... 99/386 |
| 4,731,252 | 3/1983 | Duncan ............................. 426/523 |
| 4,873,107 | 10/1989 | Archer .............................. 426/520 |

FOREIGN PATENT DOCUMENTS

63-196633  12/1988  Japan .
WO87/00261  1/1987  PCT Int'l Appl. .

Primary Examiner—Steven Weinstein
Assistant Examiner—Anthony Weier
Attorney, Agent, or Firm—Scully, Scott, Murphy & Presser

[57] ABSTRACT

An apparatus for rapidly cooking meat products for a quick service restaurant which will simulate the appearance of an open flame broiled meat product. The meat product is clamped between a grill and a series of raised crown portions formed in the bottom of a cooking pan. The cooking pan also includes rounded depressions which alternate with the upraised crowns to serve as reservoirs for the collection of fat and other rendered meat juices. The clamping action between the grill and the pan flattens the meat product having a range of product weight to a uniform thickness while simultaneously assuring conductive heat transfer from the crowns to the meat. The grill is pre-coated with a carmelizing agent which leaves grill marks on the meat product during the cooking cycle. The grill, meat product and pan are conveyed through an air impingement oven having a plurality of heated high velocity air jets which impinge on the meat product, displace a food product boundary layer of cool air, and evenly heat the irregular surface of the meat product as it passes through the jets.

15 Claims, 5 Drawing Sheets

METHOD FOR SIMULATING OPEN FLAME BROILED MEAT PRODUCTS

This is a continuation-in-part of U.S. Ser. No. 377,177, filed on Jul. 10, 1989, now U.S. Pat. No. 4,991,497, entitled Method and Apparatus for Simulating Open Flame Broiled Meat Products.

FIELD OF THE INVENTION

The present invention is intended for use in quick service restaurants to automatically and uniformly cook meat products in a manner which will simulate the appearance and texture of meat products that are individually broiled over an open flame.

BACKGROUND OF THE INVENTION

Open flame broiled cooking is highly desirable for meat products sold for public consumption, and such products have won wide customer acceptance based on their aesthetic appearance and taste to the palate.

Open flame cooking however requires constant and full time attention by a cook, and frequently results in meat products that are overdone in the thinner portions, and underdone in thicker portions. While this can be regulated to some extent by the thickness of the cut in beef products, it is difficult, if not impossible to achieve when broiling chicken or other irregularly shaped pieces of meat for sale to consumers. In particular, it is difficult to achieve in quick service restaurants which depend for the patronage on a uniformly prepared product that will appear visually the same and taste palatively the same each time the customer returns to the restaurant. With manual open flame cooking, this is difficult to achieve due to the differences in preferences by individual cooks or chefs, and at times, the work load imposed on a chef at peak lunch and dinner hours.

Therefore, there is currently a need in quick service restaurants for a method and apparatus which will rapidly and uniformly prepare meat products, particularly poultry products for consumption, wherein the product appearance simulates the appearance of an open flame broiled meat product.

DESCRIPTION OF THE PRIOR ART

Figure 4:
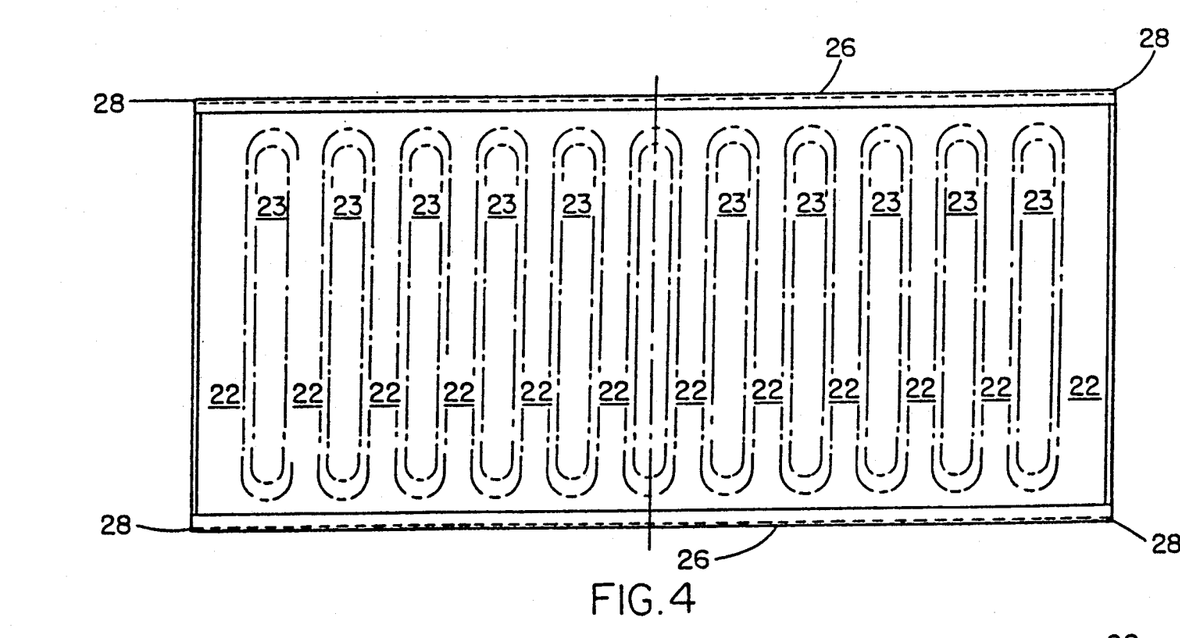
FIG. 4 is a top elevation view of the pan utilized in the present invention.
Figure 4A:
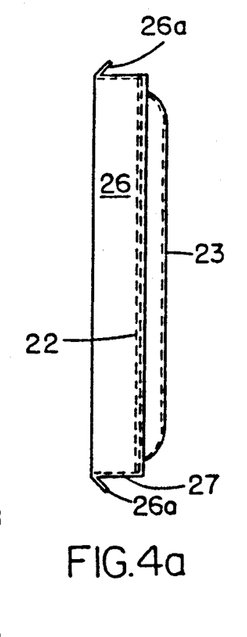
FIG. 4a is a side view of the pan illustrated in FIG. 4.

U.S. Pat. No. 1,988,087 to Perone discloses an enclosed broiler, heated from below, which is best illustrated with respect to the present invention in FIGS. 4 and 5. A grill 15 is equipped with substantial upstanding ribs 16 which supports a meat product to be cooked 18, which is secured in place by means of a grill 20.

U.S. Pat. Nos. 4,154,861 and 3,884,213 to Smith disclose air impingement ovens which utilize a plurality of perpendicularly directed high velocity jets of heated air that impinge against discrete points on the food surface to disrupt the boundary layer and thereby increase the rate of heat transfer into the product. By uniformly moving the food product through the air impingement oven, it is possible to obtain even and thorough cooking, even on irregular surfaces of a food product.

U.S. Pat. No. 4,375,184 discloses an apparatus for heating foods such as french fried potatoes which includes a pan 9 a high speed air heating source generated by a fan means 129, wherein the air passes through an open mesh grill 119 secured to the fan plenum.

U.S. Pat. Nos. 685,342, 144,945 and U.S. Pat. No. 3,019,721 all disclose devices for facilitating the cooking of meat in a broiler or oven which include a pan or plate for receiving the meat, and a grill which overlies the meat at the time the product is prepared. In addition, the '945 patent and the '721 patent both disclose reservoirs for accumulating fat and meat juices expressed from the meat product during cooking.

U.S. Pat. Nos. 1,772,171 and 1,903,324 both disclose devices which secure a product to be cooked between two grills which are clamped together, wherein the food product is heated from either side by radiant heat.

U.S. Pat. No. 3,427,955 discloses a broiler pan having a series of upstanding flat surfaces 18 for receiving a meat product 24 to be cooked.

U.S. Pat. Nos. 3,994,212 and 4,121,510 both disclose broiler pans having meat product support corrugations which extend transversely to the length of the pan.

SUMMARY OF THE INVENTION

The present invention provides a method and apparatus for rapidly and uniformly cooking meat products which simulates open flame broiling. A light weight aluminum pan means having a series of elevated crowned portions for receiving and directly conducting heat from the pan to the meat product is used in combination with a grill means which is pre-coated with a browning agent to leave caramelized grill marks on the meat product as it is cooked. It is releasably secured to the pan and is effective to clamp the meat product between the grill and the pan to a predetermined thickness during cooking, to thereby aid in the uniformity of the cooking process. The pan, meat product and grill are conveyed through an air impingement oven by an open conveyer means which allows high velocity jets of heated air to impinge on the food product from above, and on the crowned portions of the aluminum pan from below. Alternating with the crowned portions in the aluminum pan are indented reservoirs which serve to collect the fat and meat juices which are expressed by the meat product during cooking. This prevents the degradation of the texture, flavor and appearance of the meat product. During the transport through the air impingement oven, the plurality of heated jets sweep the irregular surface of a poultry meat product to be cooked to break down the boundary layer of air which normally surrounds the food product. This results in rapid heat transfer to the food product. The air impingement process removes water from the surface of the food product faster than moisture can migrate from the center towards the surface thereby browning or searing the surface of the food product without causing undesirable drying of the interior portions of the product. The combination of the char-grill pan and the air impingement oven results in an improved product which is cooked in substantially less time than conventional cook ovens and which results in a uniform product appearance which simulates the appearance of a flame broiled meat product. While the invention is equally applicable to all meat products, it is particularly useful for the simulation of open flame broiled poultry or chicken food products due to the irregular shape and configuration of these food products.

It is therefore an object of the present invention to provide a method and apparatus for uniformly and rapidly cooking a meat product unattended by a cook while simulating the appearance of an open flame broiled meat product. It is another object of the present invention to improve the consistency of both the visual appearance and the palatable taste of the food product from batch to batch as compared to manually tended open flame broiled poultry. It is another object of the present invention to provide an apparatus which may be unattended during use, except for loading and unloading the oven with pre-assembled pans of meat products. It is still another object of the present invention to significantly reduce the amount of labor involved in cooking poultry pieces by providing pre-assembled pans of chicken parts which may be stored in a refrigerated housing of predetermined temperature until immediately prior to cooking, thereby avoiding the time consuming step of individually placing and turning individual pieces of meat product on an open flame grill.

Preassembly consists of coating the underside of the grill with a caramelizing agent and then loading poultry parts into the pan and coated grill combination. The caramelizing agent may be applied to the grill concurrently with loading a poultry meat product between the grill and pan or as a prior step. The ready to cook units of poultry, pan and grill may then be stored in refrigerated accommodations until needed. The preassembly may be accomplished on the premises of the franchise intending to cook the product or at an alternate location more suitably disposed to preassembling the units and shipping them to locations for cooking, display and dissemination to consumers. During the refrigeration stage the poultry meat, pan and grill units are generally loaded onto a large rack, preferably a rolling rack, from which individual units may be removed for cooking in light demand periods or may be removed from the refrigerator as a whole to facilitate speedier preparation of a finished fast food product during heavier consumption periods such as lunch time or dinner time.

DETAILED DESCRIPTION OF THE PREFERRED EMBODIMENTS

Figure 1:
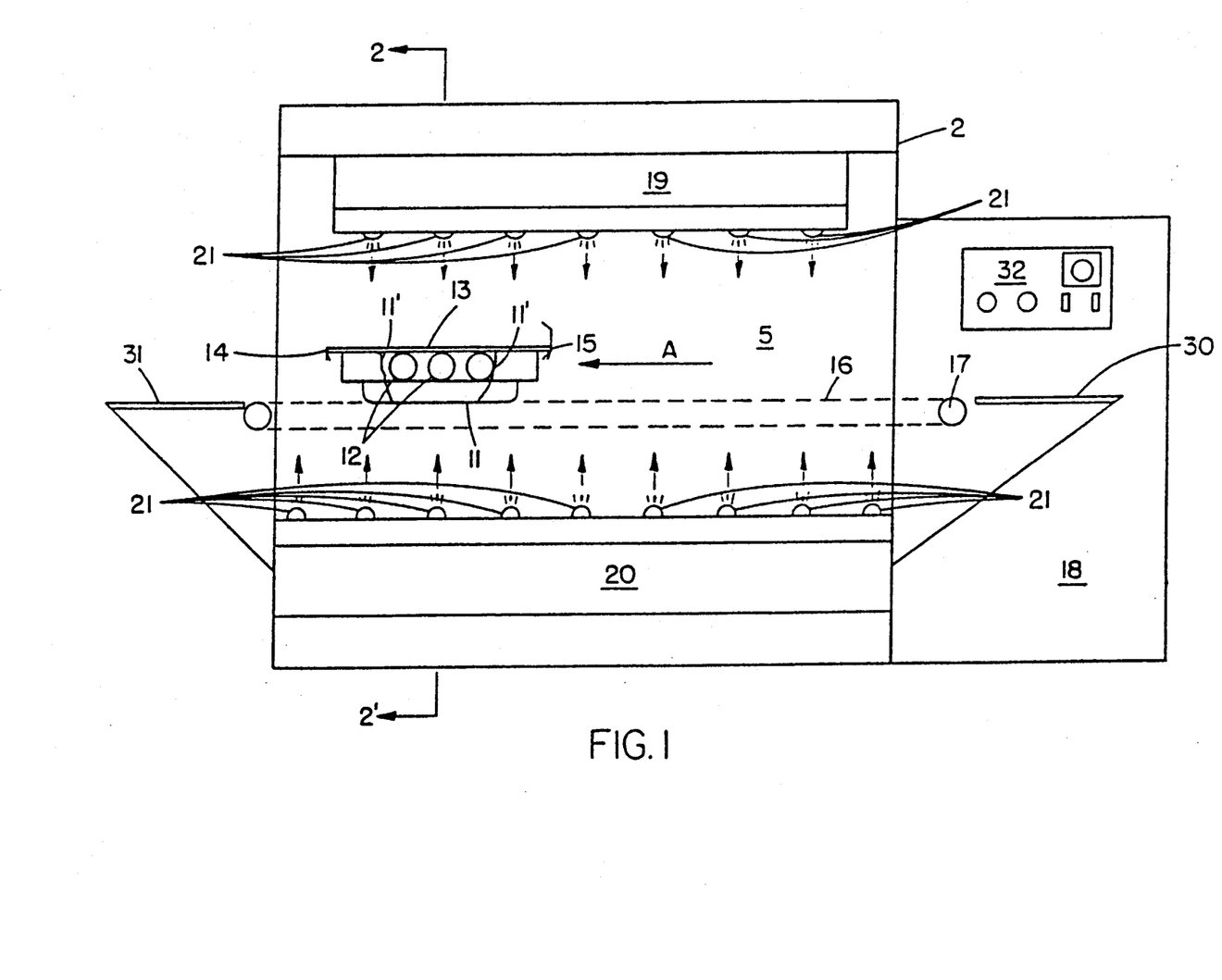
FIG. 1 is a diagrammatic front elevation view of an air impingement oven with a char-grill pan loaded with chicken parts passing therethrough.
Figure 2:
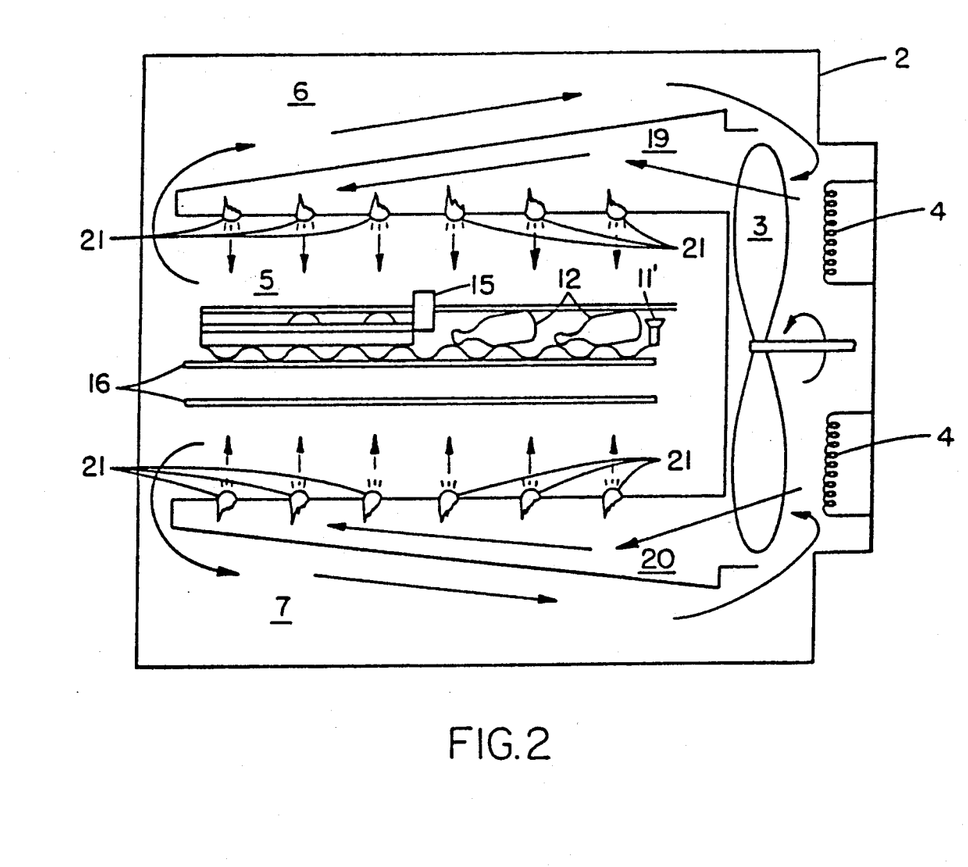
FIG. 2 is a cross-section view illustrating a side elevation of the apparatus illustrated in FIG. 1 taken along section line 2—2'.

FIGS. 1 and 2 illustrate an apparatus for rapidly cooking meat products to simulate open flame broiling. FIG. 1 is a diagrammatic frontal view, and FIG. 2 is a cross-section view taken along section lines 2—2' of FIG. 1 which illustrate an air impingement oven and improved char-grill pan and grill for rapidly and uniformly cooking irregular meat food products such as poultry, chicken or the like. The air impingement oven includes a cabinet 2, a fan 3 for creating high pressure air, and heating means 4 which are illustrated in FIG. 2 as electric heating elements. It is to be understood however that the electric elements may be replaced with gas jets if desired. Cabinet 2 is divided into a cooking zone 5, high pressure input plenums 19, 20 and return air plenums 6 and 7 which return the heat air to the fan means 3 for pressurizing the plenums 19 and 20. The amount of heat supplied to heating rods 4 may be altered by a control means 32 contained in cabinet 18 as desired to achieve selected operating results. The control means 32 can also vary the conveyer speed, which regulates the residence time in the oven.

As illustrated in FIGS. 1 and 2 the present invention includes a pan means 11 which is partially broken away as indicated at 11' which supports a meat product 12 such as a chicken drum stick to be cooked. As will be hereinafter illustrated with respect to FIGS. 4 and 5, the pan has a series of elevated crowns 22 for receiving and directly conducting heat from the pan to the meat product to be cooked. The crowned portions alternate with a plurality of reservoirs 23 for collecting fat and juices expressed by the meat product during the cooking operation. A grill 13 overlies the meat product 12 and is releasably mounted to pan 11 by means of clamps 14, 15 which will be hereinafter further explained with respect to FIGS. 3, 6 and 7. The grill is removed from the pan during placement of the meat product, and when the pan is loaded for cooking, the grill is mounted to clamp the meat to a predetermined thickness between the crowns of the pan and the underside of the grill.

The apparatus is provided with a conveyer transport means 16 which is powered by drive shaft 17 and a motor (not shown) in the support housing 18. Conveyer means 16 is an open weave or open mesh stainless steel belt that allows the impingement jets from the lower portion of the oven to directly strike the crowns of the pan 11.

The invention further includes a heating means having a pair of plenums 19, and 20 arranged above and below the transport means 16 which have a plurality of nozzles 21 which generate a plurality of high velocity jets which impinge directly on the meat product 12 from above, and on the crowns of pan 11 from below. As the char-grill pan is transported through the impingement oven in the direction of the arrow A illustrated in FIG. 1 the plurality of heated jets sweep both the surface of the meat product to be cooked and the underside of the flats of the pan to cook the meat product. In order to simulate the appearance of an open flame broiled product, it is necessary to brown or sear the surface of the meat product 12. Browning or searing cannot be accomplished on the surface of a moist food product as long as moisture migration and evaporation keep the surface damp and cooler than the boiling temperature of the moisture. Rapid browning requires heating the product with the air jets to approximately 350° F. while searing or grilling requires heating of the product surface to about 400° F. or higher. The air impingement jets exit the nozzles 21 at velocities of 2500-3000 feet per minute at a temperature of 450° F. to 550° F., and preferably about 460° F., to impinge against and sweep over the surface of the food product as it travels through the air impingement oven. This alternately creates high and low pressure areas on the surface of the food product. The progressive edges of the impinging jets remove the boundary layer of air which surrounds a cool food product and results in a rapid heat transfer to the product. The water is removed from the surface of the product faster than moisture can migrate from the center of the product towards the surface. This results in browning or searing without causing undesirable drying of the interior portions of the product. In a normal oven, the temperature of the air heating the product can easily be more than twice the temperature of the boundary layer immediately adjacent to the product. Since the cool air is substantially denser than the heated air, there is a significant lag in the transfer of heat to the product to be cooked. Radiant heat, while penetrating the boundary layer, requires relatively high temperatures at the source of the radiation, which results in a substantially higher heat gradient between the surface of the food and the interior of the food. Thus as the surface browns from radiant heat, the brown and dried surface acts to inhibit further heat transfer to the interior of the food product. This forms an insulating layer which prevents the migration of moisture from within, while continuing to absorb heat and brown on the surface. For food products of relatively uniform cross-section, this temperature gradient can be adjusted to provide the desired cooking result in the meat product. However, for irregular food products such as drumsticks or chicken breast with wings, the smaller thinner portions of the meat product become overcooked by radiant cooking before the interior of the thicker portions of the product are properly cooked.

An air impingement oven however uses a source air temperature which is substantially lower than the source temperature of a radiant heat source. This results in a milder and more controlled browning or crisping of the surface, and a more efficient heat transfer to the interior of the product.

The present invention uses both the air impingement cooking and conductive cooking to cook the meat product. The surfaces are cooked by the air impingement jets, while the pan transmits heat directly to the food product through heat conduction. As illustrated in FIG. 2, the meat product 12 is clamped between grill 13 and the crowns 22 of pan 11. As illustrated in FIG. 2, pan 11 again is illustrated in partial section with the portions at 11' being broken away to show the interior of the pan. Alternating between the crowns 22 of the pan are reservoirs 23 which collect fat and meat juices expressed or rendered from the meat product during the cooking operation. Because of the relatively high fat content of a meat product, it is not feasible to transport the meat product directly through an air impingement oven on conveyer 16 since the fat will collect on the upper surface of plenum 20 and create both a health and a fire hazard. Initial tests of the air impingement oven with a meat product included the testing of the oven with a pan and a grill, with the grill supporting the meat product in a conventional manner. The pan collected the fat and expressed juices, but also blocked effective heating of the meat product from underneath, resulting in a piece that was pale and underdone on the bottom thereof.

Following the initial test, a herringbone corrugated pan having a surface configuration similar to that illustrated in U.S. Pat. No. 4,121,510 was then tested. The V-shaped configuration provided a reservoir for the collection of fats and juices which would otherwise have ruined the texture of the meat if the meat had been allowed to lie in the fat during cooking. Tests of the herringbone design again resulted in a food product that was underdone or not completely cooked and was pale on the underside. Several alternate pan designs were then test, many of which had additional problems with rigidity, strength, the rate of heat transfer, or allowing the fat to come into contact with the food product during the cooking operation. The final design of the pan provides significant contact portions 22 which permit direct conductive heat transfer into the food product to be cooked, with spaced alternating rounded V-shaped reservoirs 23 which collect the fat and juices expressed during the cooking thereof. In addition, the grill 11 is used to clamp the food product 12 to the crowned contact areas and thereby provide conductive heat transfer and a relatively uniform cross-section for more consistent internal cooking of the meat product. The clamping action of the grill deforms the meat product to be cooked, and urges it into contact along the upper portion of the crowns to maximize conductive heat transfer. The contour of the crowns enables the juices and fats to be more easily collected in the reservoirs 23. In one test between the pan design illustrated in FIGS. 4 and 5, and a conventional herringbone pan, a chicken meat product was cooking in each pan side-by-side under the same conditions and the final product compared. The pan illustrated in FIGS. 4 and 5 produced aesthetically pleasing product with piece internal temperatures of 190° to 210° F., and with the proper color and doneness. The herringbone pan design however, produced a product with internal temperatures of 165° F. to 190° F., which was not completely cooked, and was pale on the underside.

Figures 3, 3A, 3B:
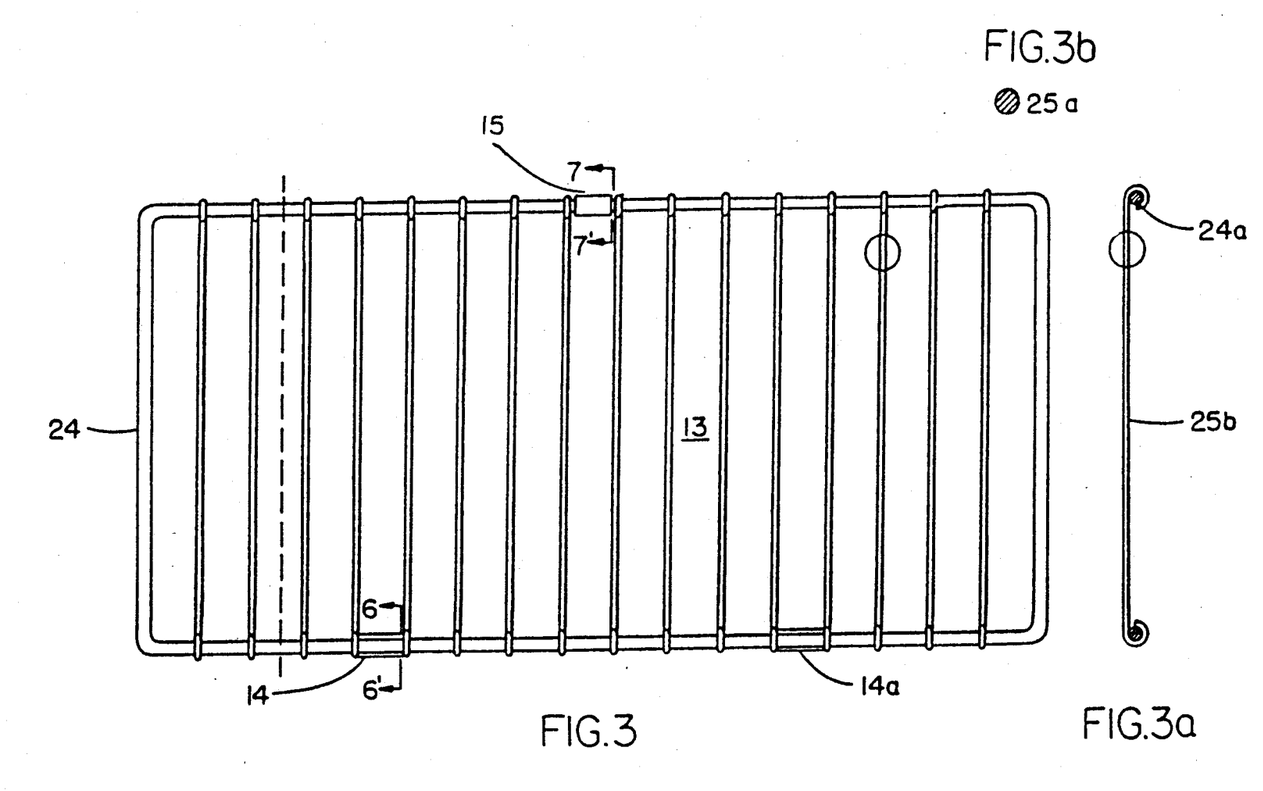
FIG. 3 is a top elevation view of the grill utilized in the present invention.
FIG. 3a is a side view of the grill illustrated in FIG. 3 illustrating a portion thereof in cross-section.
Figure 8:
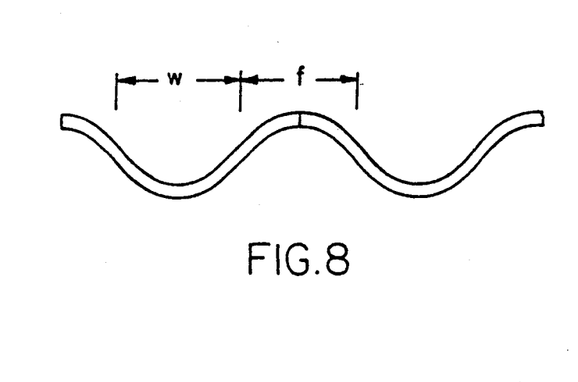
FIG. 8 is a diagrammatic view of the cross-section of the crowns and reservoirs formed in the pan illustrated in FIGS. 4 and 5.

In addition to providing a uniform meat thickness, the grill means 13 also creates a method of generating simulated burn marks on the surface of the meat product which emulates those created by open flame grilling. The top rack is roughened on the underside as indicated at 25(b) in FIGS. 3(a) and then coated with a browning agent which caramelizes and chars during the cooking cycle leaving lines on the surface of the food product wherever the top rack has touched it. The caramelizing agent is dextrose which may be suspended in water or in cocoa butter for stick application. As illustrated in FIG. 3, the grill 13 is constructed of a round ¼ inch stainless steel perimeter rod 24 having a round cross-section as illustrated at 24a, and upon which is secured a series of quarter inch round cross-section stainless steel rods 25 as illustrated in cross-section at 25a. The round rods are secured by wrapping as illustrated in FIG. 3(a), and may be further secured by welding if desired to eliminate grease entrapment cavities. The grill is clamped to the pan by means of clamp means 14, 14a and 15 which cooperate with a perimeter rib 26 formed on the exterior of pan 11. In the preferred embodiment of the present invention, pan 11 is formed from a single sheet of hardcoat anodized aluminum in a stamping operation which creates a series of rounded reservoirs 23 having a width w of approximately one inch as illustrated in FIG. 8 and a depth d of approximately ½ inch (33/64 O.A.). The stamping process creates a series of crowns 22 as the metal is drawn to the lower most portion of the reservoir 23. The sides 27 of the pan 11 may be folded upwardly and the corners 28 are secured by welding. Alternatively, the ribs 26 may be formed as drawn beads in the stamping operation that forms the reservoirs 23. The upper side walls 27 are then folded outwardly and downwardly as indicated at 26a to form reinforcing ribs 26 on two sides of the perimeter of the pan. These ribs, together with the transverse orientation and spacing of the reservoirs 23 provide enhanced stability and rigidity for the pan as compared to a conventional herringbone or corrugated design. In the preferred embodiment, the hardcoat anodized aluminum is then coated with a "non-stick" fluoropolymer coating, such as Teflon ® to aid in the cleansing of the pan after each use.

Figure 5:
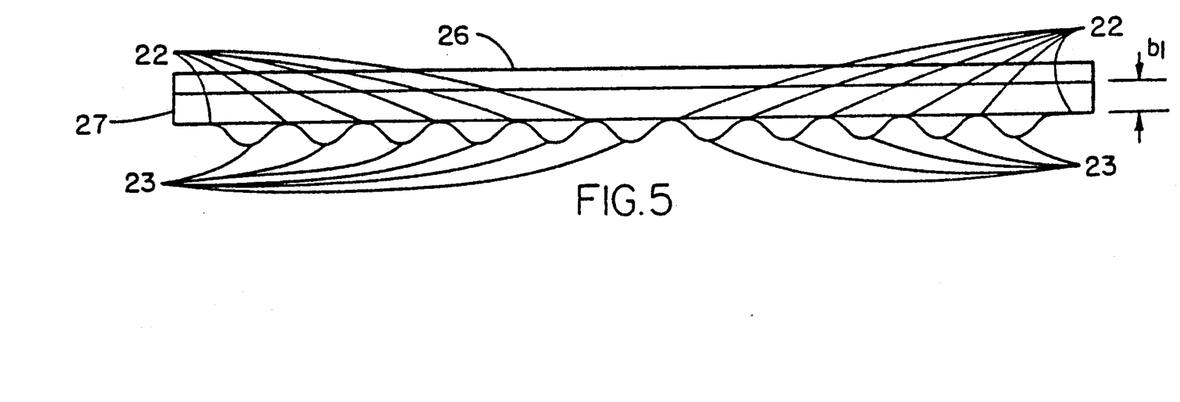
FIG. 5 is a side elevation view of the pan utilized in the present invention.
Figure 6:
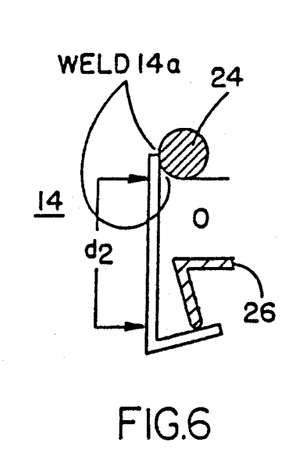
FIG. 6 is a side view of a fixed clamp means used to secure the grill to the pan.
Figure 7:
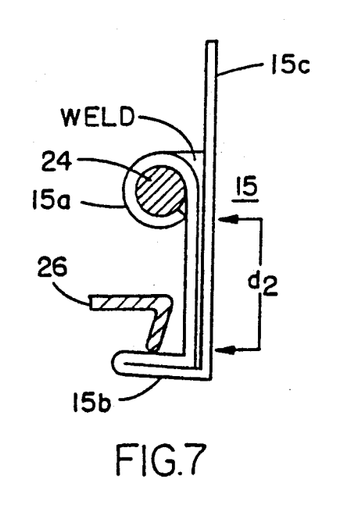
FIG. 7 is a side view of a releasable clamp means utilized in the present invention which is used to releasably secure the grill to the pan.

The grill is clamped to the pan by clamps that are illustrated in FIGS. 6 and 7 wherein FIG. 6 illustrates the fixed clamps 14, 14a which secure the grill to one side of the pan, and FIG. 7 illustrates a moveable clamp 15 which is clamped to the opposing side all rib 26(a) after the meat product has been loaded. By adjusting the height of the side walls $d_1$ as illustrated in FIG. 5, and the effective clamp length $d_2$ as illustrated in FIGS. 6 and 7, the grill will secure and flatten the meat product against the crowns 22 of the cooking pan 11. In construction, the clamp illustrated in FIG. 6 is formed of a single bend of sheet stainless steel which is welded to the exterior perimeter rod 24 as indicated at 14a. The filling of the cavity with weld material also minimizes the amount of grease that can be trapped within the crevices. The single bend 14b extends inwardly and is secured against the lower most portion 26a of reinforcing rib 26. Depending upon the thickness of the meat product to be cooked, the underside of bars 25 may come into contact with the upper portion of the reinforcing rib 26. If thicker pieces of meat are to be cooked, then $d_2$ will be greater, and the grill will not actually contact the reinforcing ribs 26, or pan 11, except through clamps 14 and 15.

The releasable clamp 15 is formed of a single sheet which is multiply folded as illustrated in FIG. 7 to provide a hinged engagement with perimeter rod 24 by virtue of the curve formed in the clamp as illustrated at 15d. The doubled over portion 15b provides a clamp for securing the grill to the perimeter rib 26, while the upstanding single thickness 15c provides a thumb release for engaging and disengaging the clamp from the perimeter of pan 11.

In the preferred embodiment of the invention, the pan and grill are 18 inches long and approximately 8 inches wide with a pan depth of 15/16 of an inch. Each of the reservoirs 23 is approximately one inch wide and each of the crowns has a distance f (illustrated in FIG. 8) of 1 inch between reservoirs. This provides a center line to center line distance between the reservoirs of approximately 1 ½ inches.

The combination of the pan configuration, the grill, and the air impingement oven creates a superior cooking apparatus which is able to significantly reduce the cook time required to cook a meat product, while simultaneously simulating the visual appearance and texture of an open flame broiled food product. Inasmuch as the transport through the air impingement oven is controlled by control means 32, the cooking is completely unattended, except for loading pans of food products to be cooked on support rack 30, as illustrated in FIG. 1, and removing the finished product from finish rack 31.

What is claimed is:

1. A method for rapidly cooking poultry meat products to simulate open flame broiling, the method comprising:
   (a) coating a grill means with a caramelizing layer;
   (b) clamping a poultry meat product between the coated grill means and a pan having an alternating series of crows and reservoirs to provide a uniform meat thickness between an upper portion of the crows and coating side of the grill;
   (c) transporting the clamped poultry product past a plurality of heated air jets located above and below said clamped poultry product to uniformly cook the poultry product by simultaneously:
      (i) impinging the plurality of heated air jets against the poultry product;
      (ii) heating the crows to transfer heat to the poultry product by conduction;
   (d) collecting expressed juices and fat in a plurality of reservoirs formed in the pan; and
   (e) charring and transferring the caramelized layer to the meat product to emulate burn marks from open flame grilling.

2. A method according to claim 1 wherein the impinging heated air jets range in temperature from 450° F.

3. A method according to claim 2 wherein the impinging heated air jets range in temperature from 450° F. to 550° F.

4. A method according to claim 2 wherein the impinging heated air jets produce moving air having a velocity of from 2500 to 3000 fpm.

5. A method according to claim 1 wherein the poultry meat product is heated to a piece internal temperature of from 190° F. to 210° F.

6. A method according to claim 1 wherein said transporting step is carried out by conveying said pan past said plurality of heated air jets on an open mesh conveyor.

7. A method according to claim 1 wherein the impinging heated air jets remove a boundary layer of cool air around the meat product.

8. A method according to claim 1 wherein an exterior portion of the meat product is seared by the impinging hot air jets.

9. A method according to claim 1 wherein the meat product is preassembled between the grill and pan and refrigerated prior to cooking.

10. A method according to claim 9 wherein the pan is coated with a fluoropolymer.

11. A method according to claim 9 wherein, the coating is applied to the grill concurrently with said preassembly step.

12. A method according to claim 9 wherein the coating is applied to the grill prior to said preassembly step.

13. A method according to claim 1 wherein the caramelizing layer is prepared by suspending a caramelizing agent in water for brush application during said coating step.

14. A method according to claim 1 wherein the caramelizing layer is prepared by suspending a caramelizing agent in cocoa butter for stick application during said coating step.

15. A method according to claim 13 or 14 wherein the caramelizing agent is dextrose.

* * * * *

UNITED STATES PATENT AND TRADEMARK OFFICE
CERTIFICATE OF CORRECTION

PATENT NO. : 5,185,172
DATED : February 9, 1993
INVENTOR(S) : Keith D. Barkhau, et al.

It is certified that error appears in the above-indentified patent and that said Letters Patent is hereby corrected as shown below:

Column 3, line 45, insert: --Fig. 3b is a cross-section of a stainless steel rod of the grill means.--

Column 6, line 46: after "25a" insert --, in Fig. 3b--

Column 7, line 11: "all" should read --wall--

Column 8, lines 4, 6 & 13, Claim 1: "crows" should read --crowns--

Column 8, line 22, Claim 2: after "F" insert --to 550° F--

Column 8, line 26, Claim 4: "claim 2" should read --claim 1--

Column 8, lines 24 & 25, delete "range in temperature from 450° F. to 550° F." and insert --are heated to about 460° F--.

Signed and Sealed this

Twenty-ninth Day of March, 1994

*Attest:*

BRUCE LEHMAN

*Attesting Officer*   *Commissioner of Patents and Trademarks*